United States Patent [19]
Mishina et al.

[11] Patent Number: 5,350,539
[45] Date of Patent: Sep. 27, 1994

[54] ALIGNMENT TREATING AGENT FOR LIQUID CRYSTAL CELL

[75] Inventors: Makoto Mishina; Toyohiko Abe, both of Funabashi, Japan

[73] Assignee: Nissan Chemical Industries Ltd., Tokyo, Japan

[21] Appl. No.: 925,670

[22] Filed: Aug. 7, 1992

[30] Foreign Application Priority Data

Aug. 13, 1991 [JP] Japan .................... 3-202917

[51] Int. Cl.$^5$ .................. C09K 19/56; G02F 1/13; C08G 67/08
[52] U.S. Cl. .................... 252/299.4; 359/75; 528/313
[58] Field of Search .............. 252/299.4; 359/75; 528/313, 320

[56] References Cited
U.S. PATENT DOCUMENTS
5,206,337  4/1993  Takeda et al. ............ 528/313

FOREIGN PATENT DOCUMENTS
0249881  12/1987  European Pat. Off. .
0259761   3/1988  European Pat. Off. .
0456512  11/1991  European Pat. Off. .

*Primary Examiner*—Shean Wu
*Attorney, Agent, or Firm*—Oblon, Spivak, McClelland, Maier & Neustadt

[57] ABSTRACT

The present invention relates to an alignment treating agent for a liquid crystal cell, which comprises an organic solvent-soluble polyimide resin comprising a tetracarboxylic acid and a diamine, at least 10 mol % of the diamine having a bivalent organic group selected from the group consisting of:

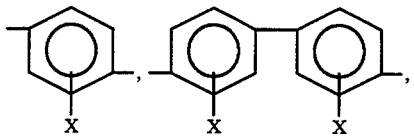

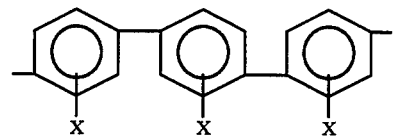

and

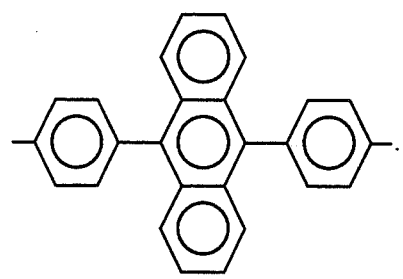

The aligned film for a liquid crystal using the solvent-soluble polyimide resin of the present invention does not require a heat treatment at a high temperature at the time of forming a resin film and enables to use a substrate poor in heat-resistance, and alignment properties such as a tilt angle and a voltage maintenance of the aligned film are not deteriorated even after durability test at a high temperature.

6 Claims, No Drawings

ALIGNMENT TREATING AGENT FOR LIQUID CRYSTAL CELL

The present invention relates to an alignment treating agent for a liquid crystal cell, particularly an alignment treating agent for a liquid crystal cell which enables heat treatment at a low temperature and provides stable alignment properties.

A liquid crystal cell is a display element utilizing an electrooptical change of liquid crystal, and is noted for being small and light as a device and consuming less electric power. Accordingly, recently, it has been remarkably developed as a display device for various displays.

Above all, a typical example includes a twisted nematic type (TN-type) electric field-effect type liquid crystal cell using a nematic liquid crystal having a positive dielectric anisotropy, wherein liquid crystal molecules are arranged on each surface of a pair of opposed electrode substrates in parallel to the substrate and the two substrates are combined in such a manner as to make the alignment directions of the liquid crystal molecules cross at right angles.

It is important for such a TN-type liquid crystal cell to have the major axis direction of a liquid crystal molecule uniformly aligned on the substrate surface in parallel and to have a liquid crystal molecule aligned at a predetermined inclined alignment angle (hereinafter referred to as "tilt angle") to the substrate. Heretofore, two methods are known as a typical method for aligning liquid crystal.

The first method comprises vapor-depositing an inorganic material such as silicon oxide obliquely to a substrate to form an inorganic film on the substrate and aligning liquid crystal molecules along the vapor-deposition direction. This method achieves stable alignment, but is not efficient for industrial use.

The second method comprises forming an organic film on a substrate surface, rubbing the surface with a cloth such as cotton, nylon or polyester at a constant direction and aligning liquid crystal molecules along the rubbing direction. This method relatively easily achieves stable alignment and is therefore often used for practical use. Examples of the organic film includes polyvinyl alcohol, polyoxyethylene, polyamide, polyimide and the like, but polyimide is most generally used due to its chemical stability and heat stability.

However, a polyimide resin generally used as a liquid crystal alignment treating agent has a disadvantage that its solubility to an organic solvent is very small. Thus, in order to form a polyimide coating film on a substrate, there is generally employed a method which comprises preparing a solution of a polyimide precursor (hereinafter referred to as polyamic acid), coating the solution on the substrate and heating to convert the polyamic acid to polyimide. However, in order to convert polyamic acid to polyimide, heat treatment at a high temperature of at least 170° C. is generally required.

The heat treatment at such a high temperature is not only unfavorable for processing but also sometimes warps a substrate such as a glass substrate and disturbs the uniformity of the alignment, thus resulting in deterioration of display quality of a liquid crystal cell.

Recently, in addition to an ordinary glass substrate, a plastic film such as polyethylene terephthalate (PET) is used as a substrate, and there have been developed other various substrates such as a glass substrate having an active element (called as "TFT") provided and a substrate having a color filter layer provided for color display of liquid crystal. However, due to their poor heat resistance, these substrates are not endurable to a high temperature at which polyamic acid is converted to polyimide, and it is therefore very difficult to form a stable polyimide film.

Thus, in the case of using a substrate having a poor heat resistance, the substrate is used by heat-treating at a temperature of lower than the heat resistant temperature of the substrate, but the conversion of polyamic acid to polyimide is not satisfactory and the durability of a cell is sometimes poor.

On the other hand, there is known a method for forming a polyimide film at a relatively low temperature, which comprises synthesizing a polyimide soluble in an organic solvent by modifying the molecular structure of the polyimide, coating a solution of the polyimide on a substrate and simply evaporating the solvent.

However, recently, a liquid crystal cell display has been required to have a more accurate uniformity of alignment in order to satisfy highly densified and precisely colored conditions. For example, in the case of STN (super-twisted nematic) mode, the stability of a tilt angle becomes important, and in the case of TFT (thin film transistor) mode, the stability of voltage maintenance becomes important. These properties are intimately connected with the properties of an aligned film, and the stability of the properties of the aligned film has an influence on the display quality of a liquid crystal cell.

The conventional solvent-soluble polyimide provides a uniform alignment by heat treatment at a low temperature, but is not always satisfactory in respect of durability and stability of alignment. For example, according to a durability test at a high temperature, a tilt angle is largely lowered; voltage maintenance is lowered; the stability of alignment is poor in comparison with an orientated film heat-treated at a high temperature; and it is difficult to stably maintain a high quality.

In order to solve the above mentioned problems, the present inventors have studied and, as a result of the study, completed the present invention.

That is, the present invention relates to an alignment treating agent for a liquid crystal cell, which comprises an organic solvent-soluble polyimide resin having a reduced viscosity of from 0.05 to 3.0 dl/g (concentration: 0.5 g/dl in N-methylpyrrolidone at 30° C.) and having the formula (1),

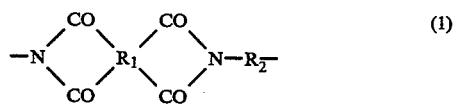

(wherein $R_1$ is a tetravalent organic group constituting a tetracarboxylic acid and its derivative, $R_2$ is a bivalent organic group constituting a diamine and at least 10 mol % of $R_2$ is a bivalent organic group selected from the group consisting of:

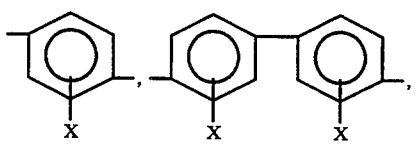

-continued

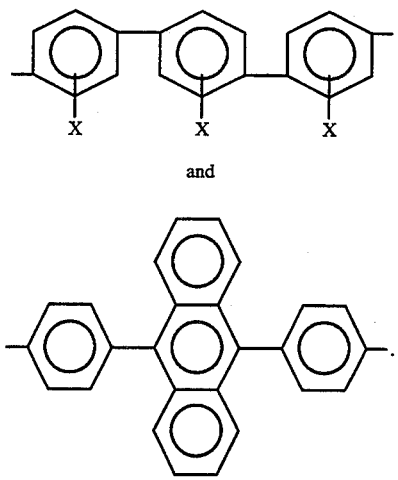

and wherein X is a hydrogen atom, an alkyl group, an acyl group, an alkoxy group or a halogen group).

The aligned film of the present invention is composed of an organic solvent-soluble polyimide resin having the specific structure, and is used as a liquid crystal-aligned film prepared by dissolving the polyimide resin in an organic polar solvent such as N-methylpyrrolidone, N,N-dimethylacetamide, N,N-dimethylformamide or γ-butyrolactone to prepare a polyimide resin solution, coating the solution on a transparent substrate such as a glass or plastic film having a transparent electrode attached, heat-treating the coated substrate at a relatively low temperature simply for evaporating the solvent to form a polyimide resin film and subjecting the film to rubbing treatment.

Since the liquid crystal-aligned film of the present invention does not require heat-treatment at a high temperature in the formation of the polyimide resin film, it can be used for a liquid crystal cell using a substrate poor in heat resistance. Moreover, in a durability test at a high temperature, alignment properties such as a tilt angle and a voltage maintenance are not deteriorated, and excellent durability and stability of alignment are provided.

A method for preparing an organic solvent-soluble polyimide resin having the repeating unit of the formula (1) of the present invention is not specially limited. Generally, the polyimide resin of the present invention can be obtained by reacting and polymerizing a tetracarboxylic acid and its derivative with a primary diamine to form a polyamic acid and subjecting the polyamic acid to dehydration-ring closure reaction to form a polyimide resin.

A tetracarboxylic acid and its derivative constituting $R_1$ in the formula (1) is not specially limited so long as the organic solvent solubility of the polyimide resin obtained therefrom is not impaired.

Examples of the tetracarboxylic acid and its derivative include aromatic tetracarboxylic acids such as 3,3',4,4'-biphenyltetracarboxylic acid, 2,3,3',4-biphenyltetracarboxylic acid, bis(3,4-dicarboxyphenyl)ether, 3,3',4,4'benzophenonetetracarboxylic acid, bis(3,4-dicarboxyphenyl)sulfone, bis(3,4-dicarboxyphenyl)methane, 2,2-bis(3,4-dicarboxyphenyl)propane, 1,1,1,3,3,3-hexafluoro-2,2-bis(3,4-dicarboxyphenyl)propane, bis(3,4-dicarboxyphenyl)dimethylsilane, bis(3,4-dicarboxyphenyl)diphenylsilane, 2,3,4,5-pyridinetetracarboxylic acid or 2,6-bis(3,4-dicarboxyphenyl)pyridine, and their dianhydrides, and their dicarboxylic acid diacid halides; cycloaliphatic tetracarboxylic acids such as cyclobutanetetracarboxylic acid, cyclopentanetetracarboxylic acid, cyclohexanetetracarboxylic acid, 2,3,5-tricarboxycyclopentylacetic acid or 3,4-dicarboxy-1,2,3,4-tetrahydro-1-naphthalenesuccinic acid, and their dianhydrides, and their dicarboxylic acid diacid halides; and aliphatic tetracarboxylic acids such as butane tetracarboxylic acid, and their dianhydrides, and their dicarboxylic acid diacid halides.

These tetracarboxylic acids and their derivatives may be used respectively alone or in a mixture of two or more.

At least 10 mol % of diamines constituting $R_2$ in the formula (1) should be a diamine (hereinafter referred to as "Diamine-A") having a bivalent organic group selected from the group consisting of

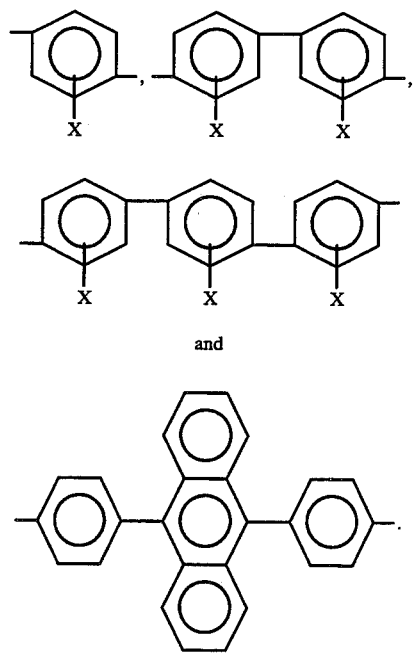

and (wherein X is a hydrogen atom, an alkyl group, an acyl group, an alkoxy group or a halogen group).

Furthermore, the above mentioned Diamine-A must be at least 10 mol %, preferably at least 20 mol %, more preferably at least 50 mol % of $R_2$.

If the content of Diamine-A is less than 10 mol % of $R_2$, excellent durability and stability of alignment, which is one of the essential features of the present invention, can not be satisfactorily achieved.

Examples of Diamine-A include aromatic diamines such as p-phenylene diamine, 2,5-diaminotoluene, 4,4'-diaminobiphenyl, 3,3'-dimethyl-4,4'-diaminobiphenyl, 3,3'-dimethoxy-4,4'-diaminobiphenyl, 1,4-bis(4-aminophenyl)benzene, 9,10-bis(4-aminophenyl)anthracene and the like.

These amines may be used respectively alone or in a mixture of two or more.

The other diamines constituting $R_2$ (hereinafter referred to as "Diamine-B") is a primary diamine generally-used for synthesizing a polyimide, and is not specially limited.

Examples of Diamine-B include aromatic diamines such as diaminodiphenylmethane, diaminodiphenylether, 2,2-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,3-bis(4-aminophenoxy)benzene, 4,4′-bis(4-aminophenoxy)diphenylsulfone, 2,2-bis[4-(4-aminophenoxy)phenyl]propane, 2,2-bis(4-aminophenyl)hexafluoropropane and 2,2-bis[4-(4-aminophenoxy)phenyl]hexafluoropropane; cycloaliphatic diamines such as bis(4-aminocyclohexyl)methane and bis(4-amino-3-methylcyclohexyl)methane; aliphatic diamines such as tetramethylenediamine and hexamethylenediamine; and diaminosiloxanes having the formula, $$NH_2(CH_2)_3\!-\!\!\left(\!SiO\!\right)_{\overline{n}}\!Si\!-\!\!\left(CH_2\right)_3NH_2$$
with $CH_3$ groups on Si (wherein n is an integer of from 1 to 10).

These diamines may be used respectively alone or in a mixture of two or more.

In order to raise a tilt angle, a diamine having a long-chain alkyl group may be used. Examples of such a diamine are listed below:

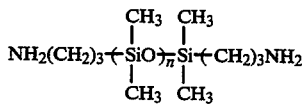

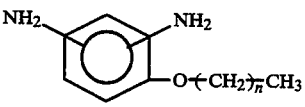

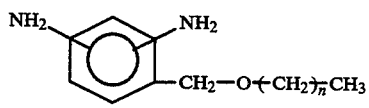

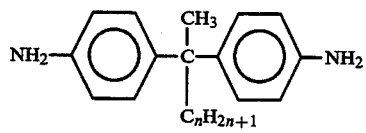

and

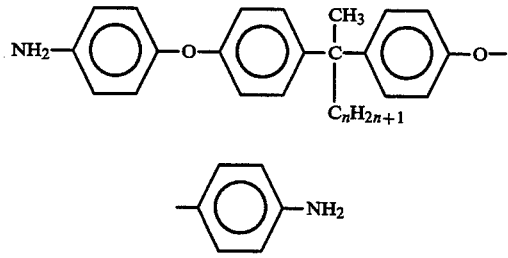

(wherein n is an integer of from 3 to 21)

The polyimide resin of the present invention is prepared by reacting and polymerizing a tetracarboxylic acid and its derivative with Diamine-A and Diamine-B to form a polyamic acid and then subjecting the polyamic acid to imide-formation by dehydration-ring closure reaction, and the tetracarboxylic acid and its derivative used in this reaction is generally a tetracarboxylic acid dianhydride. The molar ratio of the mol number of the tetracarboxylic acid dianhydride/the total mol number of Diamine-A and Diamine-B is preferably from 0.8 to 1.2. In the same manner as in ordinary condensation polymerization, the polymerization degree of the polymer thus formed becomes high according as this molar ratio becomes closer to 1.

If the polymerization degree is too low, the stability of alignment of liquid crystal becomes poor since the strength of the polyimide resin film used as an aligned film is unsatisfactory.

On the contrary, if the polymerization degree is too high, the workability at the time of forming a polyimide resin film sometimes becomes unsatisfactory.

Thus, the polymerization degree of the product of this reaction should preferably be from 0.05 to 3.0 dl/g (concentration: 0.5 g/dl in N-methylpyrrolidone at 30° C.) in terms of a reduced viscosity of a solution. A method for reacting and polymerizing a tetracarboxylic acid dianhydride with a primary diamine is not specially limited, but generally comprises dissolving the primary diamine in an organic polar solvent such as N-methylpyrrolidone, N,N-dimethylacetamide or N,N-dimethylformamide, adding the tetracarboxylic acid dianhydride to the resultant solution to react to form a polyamic acid and then subjecting the resultant polyamic acid to imide-formation by dehydration-ring closure.

The reaction temperature of a tetracarboxylic acid dianhydride and a primary diamine is optionally selected from the range of from −20° to 150° C., preferably from −5° to 100° C.

Since the polyimide resin of the present invention is characterized by being soluble in a solvent, a polyamic acid obtained by the reaction of a tetracarboxylic acid dianhydride and a primary diamine can be converted in solution into a polyimide.

The conversion of the polyamic acid into the polyimide resin in solution, is generally conducted by dehydration-ring closure process by heating. The ring closing temperature at the heat-dehydration is optionally selected from the range of from 100° to 350° C., preferably from 120° to 250° C.

Another method for converting a polyamic acid into a polyimide, comprises chemically conducting ring closure by using a known dehydration-ring closure catalyst.

The polyimide resin solution thus obtained can be used as it is, or it may be used after isolating the polyimide resin by precipitating in a bad solvent such as methanol and ethanol and redissolving the isolated polyimide resin in a suitable solvent.

The solvent used for redissolution is not specially limited as long as it dissolves the polyimide resin thus obtained, and examples of the solvent include 2-pyrrolidone, N-methylpyrrolidone, N-ethylpyrrolidone, N-vinylpyrrolidone, N,N-dimethylacetamide, N,N-dimethylformamide, γ-butyrolactone and the like.

Furthermore, other solvents which will not dissolve the polyimide resin when used alone, may be added to the above mentioned solvents as far as the solubility is not impaired.

Examples of such solvents include ethyl cellosolve, butyl cellosolve, ethylcarbitol, butylcarbitol, ethylcarbitol acetate, ethylene glycol and the like.

In order to further improve the adhesion between a polyimide resin film and a substrate, it is preferable to admix an additive such as a coupling agent with the polyimide resin solution thus prepared. A polyimide resin film can be formed on a substrate by coating this solution on the substrate and evaporating the solvent. The temperature used in this step is selected simply for evaporating the solvent, and a temperature in the range of from 80° to 150° C. will be sufficient for this evaporation.

In this manner, a polyimide resin film having a thickness of from 200 to 3,000 Å is formed on a transparent substrate such as a glass or plastic film having a transparent electrode attached, and the polyimide resin layer was subjected to rubbing treatment to form a liquid crystal-aligned film.

The present invention is further illustrated by the following Examples in more detail, but should not be limited thereto.

EXAMPLE 1

10.8 g (0.09 mol) of p-phenylenediamine, 2.92 g (0.01 mol) of 2-dodecyloxy-1,4-diaminobenzene and 29.2 g (0.1 mol) of 3,4-dicarboxy-1,2,3,4-tetrahydro-1-naphthalenesuccinic acid dianhydride (hereinafter referred to as "TDA") were reacted in 250 g of N-methyl-2-pyrrolidone (hereinafter referred to as "NMP") at room temperature for 10 hours to prepare a polyamic acid intermediate solution.

To 50 g of the polyamic acid intermediate solution thus obtained, were added 5.0 g of pyridine and 10.8 g of acetic anhydride as an imide-forming catalyst, and the resultant mixture was reacted at 50° C. for 3 hours to prepare a polyimide resin solution. This solution was poured into 500 ml of ethanol, and a white precipitate obtained therefrom was filtrated out and was dried to obtain a white polyimide resin powder. The reduced viscosity ($\eta sp/C$) of the polyimide resin thus obtained was 0.43 dl/g (0.5% by weight NMP solution, 30° C.).

0.6 g of this powder was dissolved in 29.4 g of γ-butyrolactone to prepare a solution having a total solid content of 2%, and the solution was spin-coated at 3,500 rpm on a glass substrate having a transparent electrode attached, and was subjected to heat treatment at 120° C. for 60 minutes to form a polyimide resin film.

After rubbing this coated film with a cloth, two of the plates thus obtained were placed in such a manner as to make the rubbing directions in parallel each other by intervening a spacer of 50 μm therebetween and a liquid crystal (ZLI-2293 manufactured by Merck Co.) was poured between the two plates to produce a homogeneously aligned liquid crystal cell.

The cell thus produced was rotated under crossed nicol, and light and darkness were clearly recognized, which proved the formation of a satisfactory alignment along the rubbing direction.

A tilt angle of this cell measured by crystal rotation method was 5.5°. This cell was then allowed to stand in a constant temperature bath at 95° C. for 24 hours, and a tilt angle of the cell measured in the same manner as above was 5.0°. Thus, the tilt angle was not substantially lowered.

EXAMPLE 2

17.0 g (0.08 mol) of o-tolidine, 5.58 g (0.02 mol) of 2-dodecyloxy-1,4-diaminobenzene and 29.2 g (0.1 mol) of TDA were reacted in 295 g of NMP at room temperature for 10 hours to prepare a polyamic acid intermediate solution.

To 50 g of the polyamic acid intermediate solution thus prepared, were added 5.0 g of pyridine and 10.8 g of acetic anhydride as an imide-forming catalyst, and the resultant mixture was reacted at 50° C. for 3 hours to prepare a polyimide resin solution. This solution was poured in 500 ml of methanol, and a white precipitate obtained therefrom was filtrated and was dried to obtain a white polyimide resin powder. The polyimide resin thus obtained had a reduced viscosity ($\eta sp/C$) of 0.40 dl/g (0.5% by weight NMP solution, 30° C.).

0.6 g of this powder was dissolved in 29.4 g of γ-butyrolactone, and a cell was produced in the same manner as in Example 1. The cell thus produced was rotated under crossed nicol, and light and darkness were clearly recognized, which proved the formation of a satisfactory alignment along the rubbing direction.

A tilt angle of this cell measured by crystal rotation method was 7.6°. This cell was allowed to stand in a constant temperature bath at 95° C. for 24 hours, and a tilt angle measured in the same manner as above was 7.0° C. Thus, the tilt angle was not substantially lowered.

Comparative Example 1

32.8 g (0.08 mol) of 2,2-bis[4-(4-aminophenoxy)-phenyl]propane, 5.58 g (0.02 mol) of 2-dodecyloxy-1,4-diaminobenzene and 5.85 g (0.1 mol) of TDA were reacted in 385 g of NMP at room temperature for 5 hours to prepare a polyamic acid intermediate solution.

To 50 g of the polyamic acid intermediate solution thus prepared, were added 5.0 g of pyridine and 10.8 g of acetic anhydride as an imide-forming catalyst, and the resultant mixture was reacted at 50° C. for 3 hours to prepare a polyimide resin solution. This solution was poured into 500 ml of methanol, and a white precipitate produced therefrom was filtrated and was dried to obtain a white polyimide resin powder. The polyimide resin thus obtained had a reduced viscosity ($\eta sp/C$) of 0.66 dl/g (0.5% by weight NMP solution, 30° C.).

0.6 g of this powder was dissolved in 29.4 g of γ-butyrolactone, and a cell was produced in the same manner as in Example 1. The cell thus produced was rotated under crossed nicol, and light and darkness were clearly recognized, which proved the formation of a satisfactory alignment along the rubbing direction.

A tilt angle of this cell measured by crystal rotation method was 5.5° C. This cell was then allowed to stand in a constant temperature bath at 95° C. for 24 hours and a tilt angle measured in the same manner as above was 0.9°. Thus, the tilt angle was remarkably lowered.

According to the present invention, a polyimide resin film can be formed on a transparent substrate such as a glass or plastic film having a low heat-resistant color filter or TFT attached without damaging the substrate, and liquid crystal molecules can be uniformly aligned in parallel by rubbing treatment. Also, a liquid crystal cell produced therefrom has excellent alignment stability and durability, and the alignment properties such as a tilt angle and a voltage maintenance do not vary even after a high temperature durability test.

We claim:

1. An alignment treating agent for a liquid crystal cell, which comprises an organic solvent-soluble polyimide resin having a reduced viscosity of from 0.05 to 3.0 dl/g (concentration: 0.5 g/dl in N-methylpyrrolidone at 30° C.) and having the formula (1):

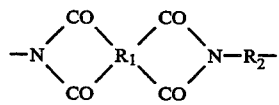

wherein $R_1$ is a tetravalent organic group constituting a tetracarboxylic acid and its derivative, $R_2$ is a bivalent organic group constituting a diamine and at least 10 mol. % of R₂ is a bivalent organic group selected from the group consisting of

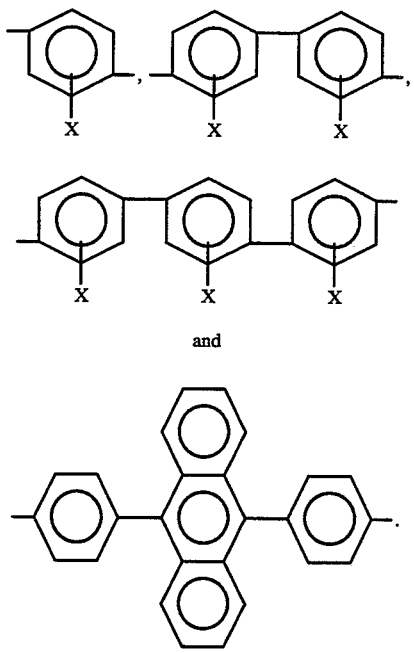

and wherein X is selected from the group consisting of hydrogen, methyl and methoxy.

2. The alignment treating agent for a liquid crystal cell according to claim 1, wherein at least 10 mol % of R₂ is a bivalent organic group constituting a diamine selected from the group consisting of aromatic diamines including p-phenylene diamine, 2,5-diaminotoluene, 4,4'-diaminobiphenyl, 3,3'-dimethyl-4,4'-diaminobiphenyl, 3,3'-dimethoxy-4,4'-diaminobiphenyl, 1,4-bis(4-aminophenyl)benzene and 9,10-bis(4-aminophenyl)anthracene.

3. The alignment treating agent for a liquid crystal cell according to claim 1, wherein (i) R₁ is a tetravalent organic group constituting a tetracarboxylic acid and its derivative selected from the group consisting of aromatic tetracarboxylic acids including 3,3',4,4'-biphenyltetracarboxylic acid, 2,3,3',4-biphenyltetracarboxylic acid, bis(3,4-dicarboxyphenyl)ether, 3,3',4,4'-benzophenonetetracarboxylic acid, bis(3,4-dicarboxyphenyl)sulfone, bis(3,4-dicarboxyphenyl)methane, 2,2-bis(3,4-dicarboxyphenyl)propane, 1,1,1,3,3,3-hexafluoro-2,2bis(3,4-2,2-bis(3,4-dicarboxyphenyl)propane, bis(3,4-dicarboxyphenyl)dimethylsilane, bis(3,4-dicarboxyphenyl)diphenylsilane, 2,3,4,5-pyridinetetracarboxylic acid and 2,6-bis(3,4-dicarboxyphenyl)pyridine, and their dianhydrides, and their dicarboxylic acid diacid halides; cycloaliphatic tetracarboxylic acids including cyclobutanetetracarboxylic acid, cyclopentanetetracarboxylic acid, cyclohexanetetracarboxylic acid, 2,3,5-tricarboxycyclopentylacetic acid and 3,4-dicarboxy-1,2,3,4-tetrahydro-1-naphthalenesuccinic acid, and their dianhydrides, and their dicarboxylic acid diacid halides; and aliphatic tetracarboxylic acids including butanetetracarboxylic acid, and their dianhydrides, and their dicarboxylic acid diacid halides; and (ii) at least 10 mol % of R₂ is a bivalent organic group constituting a diamine selected from the group consisting of aromatic diamines including p-phenylene diamine, 2,5-diaminotoluene, 4,4'-diaminobiphenyl, 3,3'-dimethyl-4,4'-diaminobiphenyl, 3,3'-dimethoxy-4,4'-diaminobiphenyl, 1,4-bis(4-aminophenyl)benzene and 9,10-bis(4-aminophenyl)anthracene;

and the remaining part of R₂ is a bivalent organic group constituting a primary diamine selected from the group consisting of aromatic diamines including diaminodiphenylmethane, diaminodiphenylether, 2,2-diaminodiphenylpropane, bis(3,5-diethyl-4-aminophenyl)methane, diaminodiphenylsulfone, diaminobenzophenone, diaminonaphthalene, 1,4-bis(4-aminophenoxy)benzene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane and 2,2-bis[4-(4-aminophenoxy)phenyl]hexafluoropropane; cycloaliphatic diamines including bis(4-aminocyclohexyl)methane and bis(4-amino-3-methylcyclohexyl)methane; aliphatic diamines including tetramethylenediamine and hexamethylenediamine; and diaminosiloxanes having the formula,

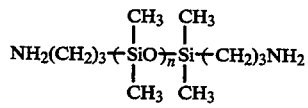

(wherein n is an integer of from 1 to 10).

4. The alignment treating agent for a liquid crystal cell according to claim 1, wherein R₂ further includes a bivalent organic group constituting a long chain alkyl-containing diamine selected from the group consisting of:

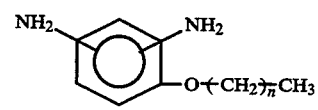

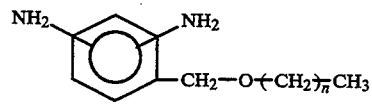

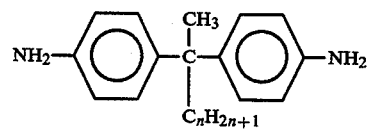

and

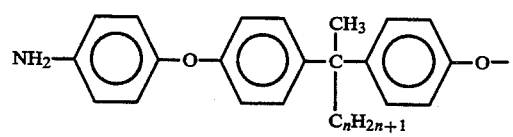

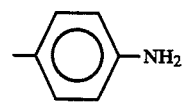

(wherein n is an integer of from 3 to 21).

5. The alignment treating agent for a liquid crystal cell according to claim 1, wherein at least 20 mol % of R₂ is a bivalent organic group selected from the group consisting of

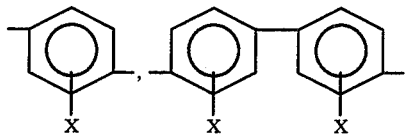

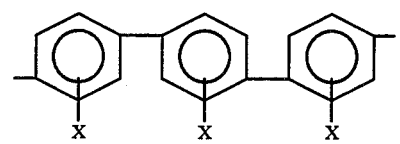

and

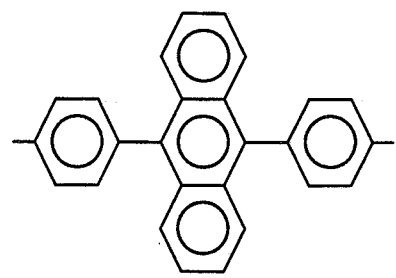

wherein X is selected from the group consisting of hydrogen, methyl and methoxy.

6. The alignment treating agent for a liquid crystal cell according to claim 1, wherein at least 50 mol % of R₂ is a bivalent organic group selected from the group consisting of

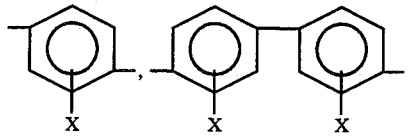

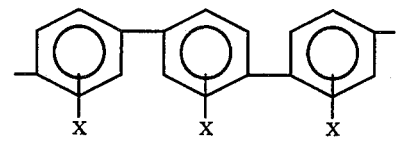

and

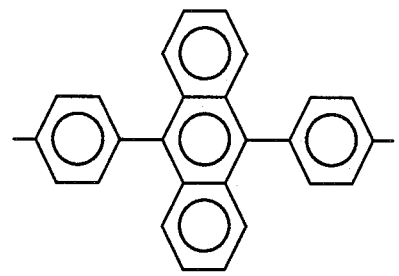

wherein X is selected from the group consisting of hydrogen, methyl and methoxy.

* * * * *